United States Patent Office 3,663,462
Patented May 16, 1972

3,663,462
PREPARATION OF ACRYLATE FOAMS
Peter Joseph Arndt, Jugenheim, Herbert Fink, Bickenbach Ueber Darmstadt, Helmut Moroff, Trautheim, near Darmstadt, and Hermine Determann and Reinhard Grimm, Darmstadt, Germany, assignors to Rohm Gesellschaft mit beschrankter Haftung, Darmstadt, Germany
No Drawing. Filed Jan. 9, 1970, Ser. No. 1,871
Claims priority, application Germany, Jan. 16, 1969,
P 19 02 076.9
Int. Cl. C08f 47/08, 37/06
U.S. Cl. 260—2.5 L                                                      10 Claims

ABSTRACT OF THE DISCLOSURE

A method of making acrylate foams by dispersing a gas in an aqueous dispersion of an acrylate polymer comprising more than 50 percent by weight of an ester of acrylic or methacrylic acid, and then removing water from the mixture. The dispersion contains at least 55 percent by weight of solids having a critical average particle size and particle size distribution defined by the settling characteristics of the dispersion when centrifuged. Acrylate foams made by this method.

---

The present invention relates to methods for preparing foams of polyacrylate resins and to the foamed products so prepared.

It is known in the art that aqueous self-cross-linking acrylate dispersions having a solids concentration of 45–50 percent can be foamed with chemical blowing agents. This process, which is described in French Pat. 1,439,843, has several deficiencies. The most serious of these is that considerable quantities of water must be evaporated during foam-forming and hardening. For example, if a 45 percent dispersion is employed in this process, there is a decrease in the volume of the cell walls of about 60 percent. This considerable structural change, which is not uniform throughout the thickness of the foam but progresses from the surfaces inward, is the cause of the non-uniform condition of the foam produced and for its tendency to crack open parallel to the surface. A further deficiency of the process of the French patent is that only dispersions which provide relatively hard and inelastic films can be foamed satisfactorily, although from the point of view of practical application those dispersions which form soft and elastic films are preferred.

Several processes are described in the literature according to which highly-concentrated, for example 60 percent, acrylate dispersions can be obtained. However, these dispersions are characterized as creamy or pasty products and are even described in German patent publication 733,995 as a "thick slurry." These materials are unsuitable for the preparation of foams because of their high viscosity.

It follows that the acrylate dispersions which can be prepared according to known processes, whatever their concentration, do not permit the preparation of foams with uniform cell structure and with the hardness and elasticity properties which are desired for technical applications. The object of the present invention is the preparation from aqueous acrylate dispersions of foams which are free of the above-described deficiencies.

The problem has been solved according to the present invention by finely dispersing an inert gas or a gas-forming chemical blowing agent in an aqueous acrylate dispersion, initiating foam-building by decomposition of the blowing agent, and removing water from the mixture until a stable foam is formed. The process employs dispersions having a solids content greater than 55 weight percent and up to about 70 percent, the resin therein having an average particle size and particle size distribution such that on centrifugation of the dispersions, diluted to a 10 percent solids content, for 15 minutes at 20° C. and at 10,000 (under which conditions the maximum free sedimentation path is 43 mm.), a sediment is deposited comprising from 10 to 80 percent, preferably from 20 to 60 percent, by weight of the synthetic resin content.

A process for the preparation of dispersions of this kind has already been proposed. They are obtained by the emulsion polymerization in an aqueous phase of a monomer phase principally comprising esters of acrylic and/or methacrylic acid. The monomer phase as such or as an aqueous emulsion is suitably run into the water phase. The concentration of emulsifier in the aqueous phase is at a value within the range from 0.5-fold to three-fold the critical concentration for micelle formation such that the aforementioned particle size and particle size distribution result. In most cases this concentration is from 0.8 to 1.5-times the critical concentration for micelle formation.

Dispersions which are in the lower region of sediment formation under the test conditions, that is which deposit about 10 to 15 percent of sediment, are so viscous that they can be used without any further additives for the preparation of foams according to the process of the invention. With increasing tendency toward sedimentation (which in general occurs with increasing particle size), the viscosity of the dispersions to be used according to the present invention decreases. At sedimentation test values above about 20 percent, it is usually necessary to thicken the dispersions with a water-soluble thickening agent or with an organic solvent. If foaming is done mechancially, the thickening agent is suitably added after foam formation.

If the amount of sedimentation exceeds 80 percent under the conditions specified, the dispersions are not suitable for the preparation of foams. These dispersions are shear-sensitive, particularly in soft formulations, which results in disturbances because of coagulate formation when they are foamed mechanically or when the foamed or unfoamed dispersions are distributed with a doctor blade on a substrate. The acrylate dispersions of the present invention not only have the advantage that they can be foamed more quickly and with a smaller heat input because of their lower water content, but also they are surprisingly more uniformly foamed than are the foams of the French patent earlier mentioned and show less tendency to crack.

A particular advantage of the present invention is that such dispersions can be made into foams which give soft and elastic films. According to a preferred embodiment of the invention, dispersions having a $T_{\lambda max}$-value of below 5° C. are used for this purpose. The $T_{\lambda max}$-value designates the temperature at which a resin film converts from the glassy state into a thermoelastic state. The temperature is determined by measurement of the damping maximum in torsion oscillation tests (cf. DIN 53,445).

The $T_{\lambda max}$-value of an acrylate polymer is determined by its monomer content. Monomers which give hard films when polymerized are, for example, methyl-, ethyl-, or propyl methacrylate, styrene and its homologs such as α-methyl styrene, and acrylonitrile or methacrylonitrile. Considerably softer films are produced by polymers of methyl- or ethyl acrylate and butyl methacrylate. The $T_{\lambda max}$-values of these polymers still are above 5° C. Outstandingly soft and elastic films are produced by polymers of butyl acrylate and of the higher ($C_5+$) esters of acrylic acid or methacrylic acid.

Copolymers having very different hardnesses and elasticities and meeting a large number of different requirements dictated by the technology of their use can be prepared from mixtures of the aforementioned monomers.

Dispersions in which the polymer has a $T_{\lambda max}$-value under 5° C. are preferred. The polymer as a rule contains considerable amounts, suitably 50–90 percent, of butyl acrylate or of acrylate esters of higher alcohols, such as 2-ethyl hexyl acrylate. Dispersions having this composition are particularly suitable for the preparation of foams on flexible substrates such as textiles, non-woven fabrics, or paper. The foams remain soft and pliable even at low temperatures, whereas foams formed from resin dispersions having a $T_{\lambda max}$-value above 5° C. become hard and brittle at temperatures under the freezing point. However, materials with higher $T_{\lambda max}$-values are also desired in certain uses, for example for foams on hard substrates which are to absorb impact energy.

Thus, the foaming of concentrated dispersions of a polyacrylate polymer comprising more than 50 percent by weight of an ester, suitably a lower ($C_1$–$C_4$) alkyl ester, of acrylic acid and/or methacrylic acid is within the scope of the invention, as is also the foaming of dispersions of such resins in which these esters are partially replaced by styrene or its homologs in amounts up to 50 percent by weight of the total monomer content.

The comonomers which can be present with an acrylate ester and/or methacrylate ester in the resin dispersions in amounts of up to 50 percent by weight, preferably less than 10 percent by weight, can fulfill various functions. Non-polar or weakly polar monomers such as acrylonitrile or methacrylonitrile, vinyl acetate and other vinyl esters, and esters of itaconic, maleic, or fumaric acids, can be incorporated into the polymer for the adjustment of certain hardness and elasticity properties. Monomers having polar groups, such as acrylic acid or methacrylic acid or their hydroxyalkyl esters, can serve on the one hand for increasing the stability of the dispersion and on the other hand to improve its adhesion. High resistance of the foams to organic solvents, which are widely present in adhesives and cleaning agents, is imparted by monomers capable of cross-linking. Certain of these can lead directly to cross-linking during polymerization, as for example divinyl benzene, triallyl cyanurate, ethylene glycol dimethacrylate, or butane diol dimethacrylate; others cross-link only at elevated temperatures. Monomers of the last-mentioned type are, primarily, the N-methylol compounds of acrylamide or methacrylamide, and the ethers, esters, and Mannich compounds which can be prepared therefrom. The exploitation of both cross-linking principles in the same copolymer is of particular advantage.

In the preparation of dispersions suitable for the process of the present invention, attention must be paid to the conditions discussed earlier when choosing the amount of emulsifier to be employed. The monomer-addition process and the emulsion-addition process, which are both well-known to those skilled in the art of emulsion polymerization, are eminently adapted thereto. In order to achieve a particle size and particle size distribution within the indicated range, it is important to maintain the emulsfier concentration in the region from 0.5 to 3-times the critical concentration for micelle formation at the beginning of the polymerization. Ionic or non-ionic emulsifiers can be used, such as alkoxylated, e.g. ethoxylated, fatty alcohols, fatty amides, or alkyl phenols, or their sulfonation products, as well as the alkali metal salts, e.g. sodium salts, of aromatic or aliphatic sulfonic acids. For purposes of stabilization for storage, against freezing, or against shearing forces, the emulsifier concentration can be considerably increased after the start of polymerization or at a later time.

All other polymerization conditions are conventional. For example, the conventional polymerization initiators such as persulfates or water-soluble redox systems are used at the temperatures necessary for free-radical formation. The monomer phase advantageously is from about 58 to 63 percent by weight of the total dispersion.

The preparation of a foamed product from a concentrated acrylate dispersion in each case involves coagulating the dispersion, while in the form of a foam, by removal of the water. The bulk of the water is removed by evaporation, usually at normal pressures by heating to temperatures over 100° C. Naturally, the water can also be removed at temperatures below 100° C. under reduced pressure, but in this case the influence of pressure changes on the foam structure before or after coagulation must be taken into account. A soft elastic foam prepared at sub-atmospheric pressure is at first compressed if exposed to atmospheric pressure, and thereafter gradually resumes its original form as air diffuses into the foam pores. This behavior of the foam can be significant in certain process embodiments, as can the reverse case in which foaming and coagulation are accomplished at super-atmospheric pressures so that the foam temporarily expands when exposed to normal pressures.

If the foam is placed on an absorbent substrate, the aqueous phase of the dispersion can be partially or fully absorbed by the substrate so that the foam solidifies without the application of heat. This possibility presents itself when thick hydrophilic substrates are coated with thin foam layers.

The dispersions can be particularly well foamed if their viscosity is at least about 10000–20000 centipoises. Dispersions having a sedimentation test value of 10–15 percent are of this viscosity in the absence of additives. Dispersions having higher sedimentation test values are suitably thickened somewhat, for which purpose water-soluble thickening agents such as polyvinyl alcohol, polyvinyl pyrrolidone, polyacrylamide, the alkali metal and ammonium salts of polyacrylic acid or polymethacrylic acid or of copolymers of acrylic acid and methacrylic acid, cellulose ethers, or natural products such as gelatin or alginate, are appropriate. In many cases, the addition of a solvent such as chloroform or ethyl acetate or—in the case of emulsion polymers containing carboxyl groups—of ammonia or alkalis, suffices to thicken the dispersions.

Although the dispersions contain an emulsifier introduced during their preparation, the amount of emulsifier is as a rule insufficient to stabilize the foams formed to the point of coagulation of the dispersed particles. Therefore, in most cases additional foam-promoting surface-active agents should be added. Compounds which give the combined effects of a foam stabilizer and of a thickening agent are particularly suitable, for example ammonium salts of acrylic acid copolymers.

Two different methods can be employed for foam formation, namely mechanical and chemical foaming. The mechanical process is characterized by simplicity and economy and involves the fine dispersion of an inert gas throughout the resin dispersion and subsequent solidification of the foam. In the simplest case, the dispersions are stirred with a high speed mixer in the presence of air until a spreadable, pasty, fine-pored foam is formed. Air or some other inert gas such as nitrogen or carbon dioxide can additionally be introduced into the dispersions through a screen or grid. The foam, in the desired viscosity, is then put on the substrate and the water evaporated.

For chemical foaming, the dispersion is combined with a gas-forming blowing agent. Foaming and film-formation then generally occur simultaneously during heating. However, one process can take place more rapidly than the other, or can even be completely finished before the other begins.

A number of blowing agents are known for the preparation of foams. Some of them release gases such as nitrogen, carbon dioxide, or carbon monoxide on warming. Azo compounds such as azodicarbonamide and azobisisobutyronitrile, nitrosamines such as dinitroso-pentamethylene tetramine, hydrazides, ammonium bicarbonate, etc. belong to this class of blowing agents. The last-mentioned compound also foams under the influence of aqueous acids. Sodium borohydride is decomposed under the influence of water alone, with the generation of hydrogen. A number of further blowing agents adaptable to the process of the present invention are mentioned in French Pat. 1,439,-843.

Whether or not heating is necessary during or after foam formation depends on the nature of the acrylate resin, and may also depend on the decomposition temperature of the foaming agent and on the method of water removal. If the dispersions are mechanically foamed, or are foamed with a blowing agent effective at room temperature, such as sodium borohydride, and if a very thin foam layer is laid down on an absorbent substrate, no heating is necessary. However, the majority of chemical blowing agents require decomposition temperatures above 50° C. Such blowing agents can be used at temperatures between 50° C. and 100° C. if foams are coated onto absorbent substrates, or if water is removed under reduced pressure. If thick foam layers are prepared or non-absorbent substrates are used and processing takes place at atmospheric pressure, the foam is generated at temperatures above 100° C. Foams formed from dispersions of self-cross-linking resins are heated to the cross-linking temperature of the resin during or after formation of the foam. This temperature is from about 120° C. to 160° C. in the case of dispersed resins containing methylol acrylamide groups.

The foaming of resin dispersions which form films having $T_{\lambda max}$-values under 5° C. opens up new areas of technical usefulness to acrylate foams. Such foams retain their flexibility even at low temperatures. For an extremely soft resin formulation, flexibility is completely retained at temperatures as low as −40° C.

The foam in every case is prepared on a substrate. The surface of the substrate can be treated, for example by the use of a silicone resin coating, so that the foam does not adhere to it and can be removed as an unsupported film when complete. In most cases, however, good adhesion to the substrate is desired. This adhesion is the better the softer and more elastic the foam. On textile substrates such as of cotton or synthetic fibers, on textured fabrics, and on non-woven fabrics, the foams give leather-like products having a hand like that of natural leather. To overcome any slight tackiness of the surface, a top coat of a harder non-foaming dispersion can be added. Both the foam and top coat are preferably prepared from a self-cross-linking dispersion in order to assure resistance to chemical cleaning agents, adhesives, and the like.

A further advantage in the use of "soft" dispersions in the process of the invention is the great uniformity of the resulting foam and in the only slight sensitivity of the process to non-uniform foaming conditions. Whereas "hard" dispersions tend to crack if foamed rapidly with chemical foaming agents or if dried rapidly (both of which conditions can result from too high a working temperature), the "soft" dispersions do not exhibit these drawbacks over a wide range of operating conditions.

It is often difficult to distribute foamed or non-foamed dispersions with a doctor blade on delicate substrates such as textured or very thin fabrics. In this case, it is preferred to put the dispersion on a supporting layer provided with a parting layer, for example a strip of silicone-coated paper, to cover the layer with the delicate substrate, and then to remove the supporting layer after hardening. By using nubby substrates or substrates having a raised pattern, foams having a special surface texture can be prepared. The foams can also be reinforced with threads, wires, fabric or glass cloth, metal mesh, and the like by introducing these materials into the foamed or unfoamed dispersions.

In addition to the preferred use on textile substrates, foams of every degree of hardness can be laid down on substrates such as wood, plastic, metal, paper, cardboard, hard foam materials, and the like. In addition to their use as synthetic leathers, the products of the invention can typically be used as backing layers for carpets and rug pads; as impact-protective layers for the instrument panel, side walls, and interior roof of automobiles; as decorative wall panels and furniture panels; as interior coatings for containers for sensitive devices such as photo apparatus, binoculars, and eyeglasses; and for many other purposes.

A better understanding of the present invention and of its many advantages will be had by referring to the following specific examples given by the way of illustration.

EXAMPLE 1

100 parts by weight of a 60 percent self-cross-linking acrylate resin dispersion in which the polymer phase comprised 52 percent of methyl methacrylate, 42 percent of butyl acrylate, and 6 percent of N-methylolmethacrylamide, and which had a $T_{\lambda max}$-value of 46° C., a viscosity of 2000 centipoises (measured with a Brookfield viscosimeter, spindle II, 6 r.p.m.), and a sedimentation value of 37 percent [measured with a Phywe "Pirouette" Type 45200/1 heavy-duty laboratory centrifuge (Rotor 45201, 50 ml. insert cup 45208)]( was foamed by stirring in air until it had doubled in volume. The foam was thickened to a spreadable consistency and simultaneously stabilized by the addition of five parts by weight of a 20 percent aqueous solution of the sodium salt of a methacrylic acid-styrene copolymer.

This mass was applied with a doctor blade onto a sheet of fiberboard in a thickness of 5 mm., dried at 800° C.–90° C., and subsequently condensed at 140° C.

An open-celled, fine-poured, but still flexible hard foam resulted.

EXAMPLE 2

100 parts by weight of a 58 percent self-cross-linking acrylate resin dispersion having a viscosity of 500 centipoises and a sedimentation value of 40 percent, both measured as in Example 1, a $T_{\lambda max}$-value of −20° C., and a polymer phase comprising 90 percent by weight of butyl acrylate, 7 percent of acrylonitrile, and 3 percent of N-methylolmethacrylamide was thickened with 0.6 parts of hydroxyethyl cellulose available commercially under the tradename "Natrosol 250HR." For this purpose, the thickening agent was made into a slurry with an eight-fold amount of a 1:1 mixture of water and ethyl alcohol and then stirred into the dispersion at 2000 r.p.m. The dispersion thickened in this manner was left to stand for 30 minutes and was then again thoroughly agitated. Finally, 6 parts by weight of ammonium carbonate were uniformly distributed into the dispersion as a blowing agent.

The thickened mass was now spread onto a napped cotton fabric, dried first at 80° C.–90° C., and subsequently condensed at 140° C. The foam obtained is open-celled, has very fine pores, and is soft. The surface is slightly tacky.

EXAMPLE 3

100 parts by weight of the dispersion described in Example 2 were foamed by stirring in air until the dispersion was 2½ times its original volume. After the addition of 7 parts by weight of a 20 percent aqueous solution of the sodium salt of a methacrylic acid-styrene copolymer, the mass was spread with a doctor blade onto a substrate. After drying at 80° C.–90° C., the material was condensed at 140° C. An open-celled, finely-pored and very flexible foam having a slightly tacky surface was obtained.

EXAMPLE 4

100 parts by weight of a 60 percent self-cross-linking acrylate resin dispersion having a viscosity of 500 centipoises, a sedimentation value of 34 percent, a $T_{\lambda max}$-value of −40° C., and a polymer phase comprising 97 percent of butyl acrylate and 3 percent of N-methylol-methacrylamide, were thickened with 0.5 part by weight of hydroxyethylcellulose ("Natrosol 250HR"). The hydroxyethylcellulose was added as described in Example 2. The thickened dispersion was left to stand for 30 minutes and then once more thoroughly mixed. Subsequently, five parts by weight of a substituted thia-triazole commercially available under the trade name "Porofor TR" were stirred into and uniformly dispersed in the dispersion as a blowing agent. After spreading this mass onto a silicone-coated paper, the dispersion layer was laminated to a napped cotton fabric under slight pressure, dried at 80° C.–90° C., and condensed at 140° C. The silicone paper was then removed. An open-celled, finely-pored and flexible foam layer having a dry and non-tacky surface was obtained.

EXAMPLE 5

A 60 percent poly-butyl methacrylate dispersion having a viscosity of 2000 centipoises, a sedimentation value of 38 percent, and a $T_{\lambda max}$-value of 5° C., was stirred in air until the dispersion was 3 times its original volume. The mass was spread with a doctor blade onto a silicone paper, and dried at 80–90° C. After removing the silicone paper, a soft foam layer having tacky surfaces is obtained.

EXAMPLE 6

Example 5 is repeated using a 57 percent acrylate resin dispersion having a viscosity of 3100 centipoises, a sedimentation value of 40 percent, a $T_{\lambda max}$-value of 10° C. and a copolymer composition of butyl methacrylate and glycol dimethacrylate in a weight-ratio of 98:2.

The resulting foam layer is soft and less tacky than that of Example 5 and almost unaffected by organic solvents such as ethyl acetate or chloroform.

EXAMPLE 7

The procedure of Example 5 is repeated with the following changes: an acrylic resin dispersion of 59 percent solids contents having a viscosity of 6000 centipoises, a sedimentation value of 18 percent, a $T_{\lambda max}$-value of 35° C., and a pH-value between 8 and 9 is used. The acrylic resin is composed at 54 percent of methyl methacrylate, based on the weight of the copolymer, 45 percent of butyl acrylate, and 1 percent of acrylic acid.

The foam layer obtained is hard, tough but still flexible.

EXAMPLE 8

Example 5 is repeated using a 60 percent resin dispersion having a viscosity of 5000 centipoises, a $T_{\lambda max}$-value of 18° C., a sedimentation value of 22 percent, the copolymer being composed of 40 percent of methyl methacrylate, 54 percent of butyl acrylate, 5 percent of diethyl fumarate and 1 percent of methacrylic acid, all percentages being by weight of the copolymer.

A soft, flexible and slightly tacky foam layer is obtained after drying as in Example 5.

What is claimed is:

1. In a method for making acrylate foams by dispersing a gas in an aqueous dispersion of an acrylate polymer and removing water from the mixture until a stable foam results, the improvement wherein said dispersion has a solids content of at least 55 percent by weight of an acrylate polymer comprising more than 50 percent by weight of an ester of acrylic acid or methacrylic acid, said polymer further having an average particle size and particle size distribution such that on centrifuging the dispersion, diluted to 10 percent solids content, for 15 minutes at 20° C. and about 10,000 g., from 10 to 80 percent by weight of the total polymer content is deposited as sediment.

2. A method as in claim 1 wherein said gas is mechanically dispersed in said aqueous dispersion of an acrylate polymer.

3. A method as in claim 1 wherein a blowing agent is additionally present in said aqueous dispersion and is decomposed to generate and disperse gas therein.

4. A method as in claim 1 wherein said acrylate polymer has a $T_{\lambda max}$-value below 5° C.

5. A method as in claim 1 wherein said dispersion has a viscosity of at least 10,000 to 20,000 centipoises.

6. A method as in claim 5 wherein a water-soluble thickening agent is present in said dispersion.

7. A method as in claim 1 wherein said acrylate polymer is self-cross-linking.

8. A method as in claim 1 wherein said dispersion has a polymer solids content of about 58 to 63 percent by weight.

9. An acrylate foam prepared by the method of claim 1.

10. An acrylate foam prepared by the method of claim 4.

References Cited

UNITED STATES PATENTS 3,355,316    11/1967    Hellman et al. _____ 260—2.5 L

FOREIGN PATENTS 1,439,843    4/1966    France _____ 260—2.5 L

SAMUEL H. BLECH, Primary Examiner

W. J. BRIGGS, SR., Assistant Examiner

U.S. Cl. X.R.

161—67, 159; 260— 29.6 TA, 29.6 H, 29.6 HN; 264—50